United States Patent
Boucher et al.

(10) Patent No.: US 10,235,153 B2
(45) Date of Patent: Mar. 19, 2019

(54) DOWNLOADING DATA INTO DISTANT EQUIPMENT

(71) Applicant: AIRBUS OPERATIONS (S.A.S.), Toulouse (FR)

(72) Inventors: Patrice Boucher, Tournefeuille (FR); Nicolas Wacyk, Toulouse (FR)

(73) Assignee: Airbus Operations (S.A.S.), Toulouse (FR)

( * ) Notice: Subject to any disclaimer, the term of this patent is extended or adjusted under 35 U.S.C. 154(b) by 48 days.

(21) Appl. No.: 14/996,793

(22) Filed: Jan. 15, 2016

(65) Prior Publication Data

US 2016/0210137 A1 Jul. 21, 2016

(30) Foreign Application Priority Data

Jan. 16, 2015 (FR) ...................... 15 50339

(51) Int. Cl.
*G06F 8/65* (2018.01)
*H04L 29/06* (2006.01)
*H04L 29/08* (2006.01)

(52) U.S. Cl.
CPC .............. *G06F 8/65* (2013.01); *H04L 65/102* (2013.01); *H04L 67/10* (2013.01); *H04L 67/12* (2013.01); *H04L 67/34* (2013.01)

(58) Field of Classification Search
CPC ......... G06F 8/65; H04L 65/102; H04L 67/10; H04L 67/12; H04L 67/34
USPC ........................................................ 717/173
See application file for complete search history.

(56) References Cited

U.S. PATENT DOCUMENTS

| 2003/0182404 | A1* | 9/2003 | Saint-Etienne | G06F 13/4027 709/220 |
| 2005/0243779 | A1* | 11/2005 | Bolz | G07C 5/008 370/338 |
| 2007/0027589 | A1* | 2/2007 | Brinkley | G08G 5/0013 701/3 |
| 2009/0077267 | A1* | 3/2009 | Alrabady | H04L 67/34 709/249 |
| 2010/0205301 | A1* | 8/2010 | Ansari | G06Q 30/04 709/225 |
| 2015/0088934 | A1* | 3/2015 | Beckman | G06F 21/6227 707/781 |
| 2015/0245182 | A1* | 8/2015 | Scagnol | H04L 43/0817 370/312 |

(Continued)

FOREIGN PATENT DOCUMENTS

EP 1349078 10/2003
WO WO 2009/082592 7/2009

OTHER PUBLICATIONS

Search Report for FR 15 50339 dated Nov. 2, 2015.

*Primary Examiner* — Li B. Zhen
*Assistant Examiner* — Zengpu Wei
(74) *Attorney, Agent, or Firm* — Jenkins, Wilson, Taylor & Hunt, P.A.

(57) ABSTRACT

The disclosure herein updates distant equipment while avoiding protocols and connections and concerns a deported downloading system of data on distant equipment, and includes a gateway adapted to receive a set of data comprising operational data addressed to the distant equipment as well as a temporary downloading engine, the gateway being also adapted to download the operational data into the distant equipment by starting the execution of the downloading engine.

7 Claims, 4 Drawing Sheets

(56) References Cited

U.S. PATENT DOCUMENTS

2016/0080260 A1\* 3/2016 Wang .................... H04L 67/025
                                                    370/392

\* cited by examiner

DOWNLOADING DATA INTO DISTANT EQUIPMENT

CROSS-REFERENCE TO RELATED APPLICATION

This application claims priority to FR 15 50339 filed Jan. 16, 2015, the entire disclosure of which is incorporated by reference herein.

TECHNICAL FIELD

The present disclosure relates to the field of deported downloading of data into distant equipment via a gateway, and, more particularly, relates to a deported downloading of data into downloading-enabled equipment via a modular platform.

In different industrial fields such as, for example, aeronautics, railroad, maritime, automobile, it is often necessary to update downloading-enabled computers or equipment.

On old generations of aircraft in the aeronautics field in particular, each action system or control system (for example the landing gear, the power supply system, etc.) developed its own computer, referred to as an LRU (Line Replaceable Unit), and administered different elements (peripherals, cables, inputs, outputs, sensors, actuators, etc.). Each computer or LRU comprised a hardware part and a software part.

Today, in order to reduce costs and optimize the weight of an aircraft, the hardware parts have been separated from the software parts to form an integrated and modular avionics architecture referred to as IMA (Integrated Modular Avionics). This IMA modular system enables a reduction in the number of items of equipment in an aircraft and consequently a reduction in development and qualification costs.

In an IMA modular architecture, deported downloading refers to the downloading of software, configuration tables, a part of a software program or any other data into distant equipment via a gateway. The deported downloading thus supplies downloading capacities to equipment which would not be able to benefit from them without being dismantled.

According to the prior art, the principle of deported downloading consists for a user of selecting, on an HDL (Host Data Loader) downloading server or computer, the data to be downloaded and the distant equipment for which these data are intended. The deported downloading operation is then initialized by the HDL and the data are sent to a gateway, this gateway being implemented, in particular, on an IMA platform. In fact, the data must first pass through the gateway before reaching the distant equipment into which they are to be downloaded. A downloading application hosted on the gateway receives the data as well as the equipment address from the HDL via a first medium. The gateway processes these data in order to be able to send them on a different medium used by the destination equipment. Finally, the downloading application transfers the data to the distant equipment using a protocol specified by the gateway owner.

By the deported downloading, it is thus possible to download directly to distant equipment via a gateway and via different media.

However, the deported downloading entails some limitations that may be intrinsic to the architecture and, in particular, to the fact of having different parties involved. In fact, if an equipment manufacturer wishes to update the software of its equipment, it is obliged to pass through the HDL and the gateway which are supplied by other equipment manufacturers. Consequently, it is not in control from the beginning to the end of the communication or in control of the protocols for updating its equipment, as would be the case with a direct update when the equipment is dismantled.

The deported downloading thus involves different parties, different protocols and different specifications. In particular, a protocol between the HDL and the gateway is involved, with a need to define a specification for the interface between them. Furthermore, there are as many protocols as there are types of bus between the gateway and the different items of distant equipment for which interface specifications must also be defined. Moreover, it is necessary for each party involved to comply with the deported downloading specification and with the standards used, and, in particular, the equipment that must receive the data must be compliant with the protocols specified by the gateway owner.

In the case where a plurality of system suppliers do not use the same protocol, two interface specification levels are required. On the first level, the interface between the HDL and the gateway must be specified, knowing that the number of specifications is multiplied in the case of different types of gateway. The interfaces between each distant equipment and the HDL must also be specified. Each supplier or equipment manufacturer must take account of the protocol problem and the problem of compatibility of the equipment with the HDL. On the second level, the interfaces between the gateway and each equipment must be specified, taking account of the different media that are used.

Furthermore, a number of downloading engines corresponding to all the different protocols likely to be used between the gateway and the equipment must be provided in each gateway. In fact, for each gateway, this architecture requires a deported downloading application that must be able to take account of all the different protocols available to users (A429 (for ARINC 429), CAN (Controller Area Network), MIL 1553, etc.). More particularly, in order to offer maximum flexibility for the distant equipment connected to the gateway, this gateway must have the facility to manage all the protocols, resulting in an additional development and a loss of computing and memory resource (PROM, CPU, RAM, etc.) for other functions on the gateway. Furthermore, this increases development, configuration and testing costs and time, complicates gateway maturity and undermines the concept of a generic modular platform as a result of the need to develop as many protocols as there are buses or protocols used by the equipment needing to be updated via the gateway implemented on an IMA modular platform.

End-to-end integration also becomes complex and must be achieved by the prime contractor (for example the aircraft or train manufacturer) since it is the only entity to have a complete overview of all the parties involved during the integration or assembly phase. Furthermore, a risk exists of discovering non-conformances between the different parties involved (IMA platform supplier, LRU supplier, HDL supplier) at a late stage in the development, knowing that these parties are able to test the deported downloading application only at a very late stage since they must wait for the development and availability of the HDLs and the complete IMA platform. They are therefore dependent on two other parties involved. All these limitations and constraints may cause misunderstandings in the interface or protocol specifications which may result in a loss of time in development and an additional cost incurred in updating the specification.

SUMMARY

An object of the present disclosure is consequently to overcome the aforementioned disadvantages by a method and a system for the deported downloading of data into distant equipment via a gateway, enabling each party involved to avoid the protocols and connections specified by the other parties involved.

An object of the present disclosure is to update distant equipment by avoiding protocols and connections and concerns a method and a system for the deported downloading of data into distant equipment, the system comprising a gateway adapted to receive an encapsulation layer concatenating a set of data including a downloading header relating to the distant equipment, operational data addressed to the distant equipment as well as a temporary downloading protocol engine relating to a protocol part between the gateway and the distant equipment, the gateway furthermore being adapted to download the operational data into the distant equipment by starting the execution of the downloading engine.

BRIEF DESCRIPTION OF THE DRAWINGS

Other characteristics and advantages of the system and the method according to the disclosure herein will become clearer from a reading of the description given below, in an indicative but non-limiting manner, with reference to the attached drawings in which.

DETAILED DESCRIPTION

A principal of the disclosure herein notably relates to including a temporary downloading engine in the data intended for the distant equipment.

Figure 1:
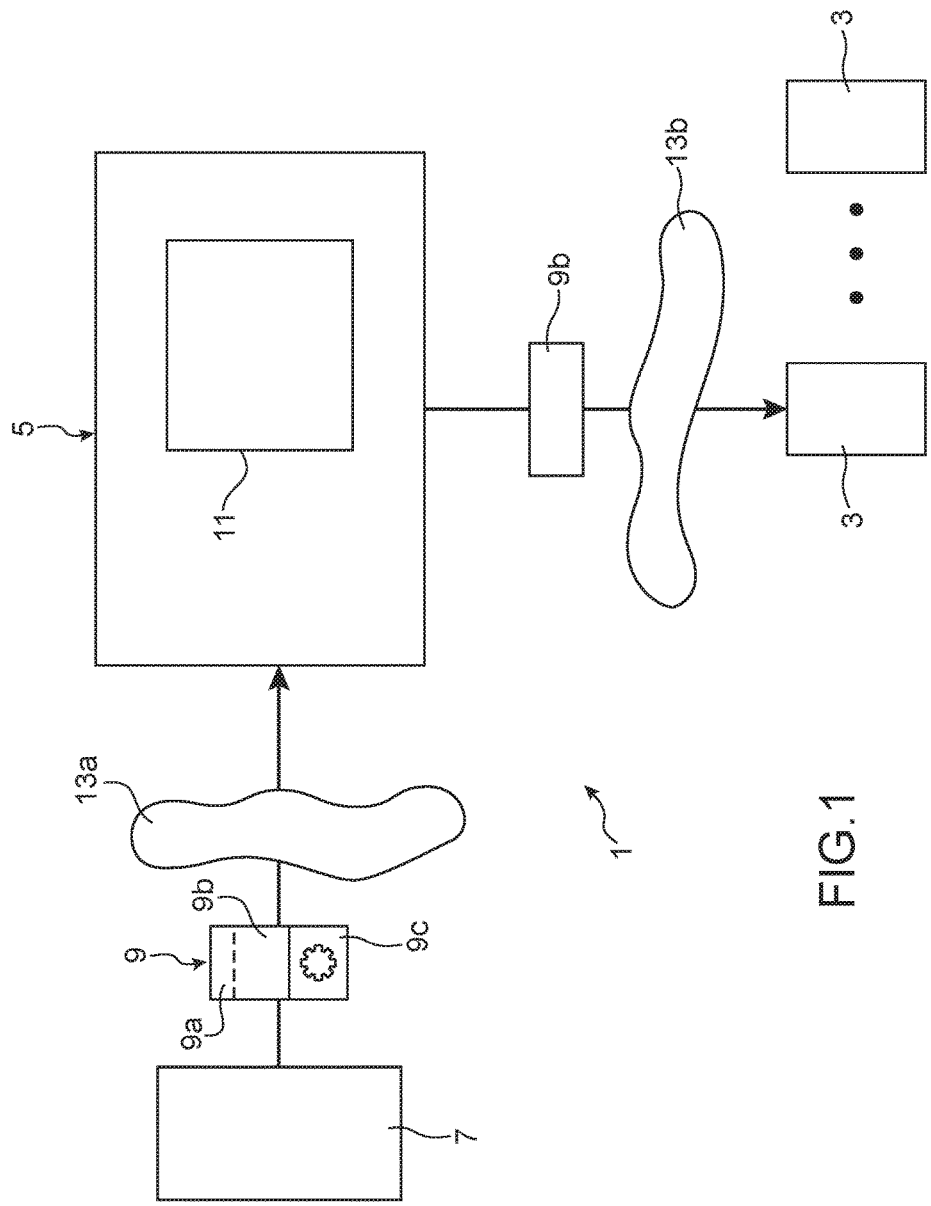
FIG. 1 shows schematically a system for the deported downloading of data into distant equipment according to one embodiment of the disclosure herein.

FIG. 1 shows schematically a system 1 for the deported downloading of data into distant equipment 3 according to one embodiment of the disclosure herein.

The downloading system 1 comprises a gateway 5 adapted to receive, from a downloading server or computer 7 (HDL), a set 9 of data including a subset of operational data 9a, 9b addressed to the distant equipment 3 as well as a temporary downloading protocol engine 9c. It will be noted that the set 9 of data is supplied by the party responsible for the distant equipment 3 into which the data are to be downloaded, and the operational data 9a, 9b addressed to the distant equipment comprise the address of this equipment. The gateway 5 is furthermore adapted to download the operational data into the distant equipment 3 by starting the execution of the downloading protocol engine 9c. More particularly, the gateway 5 comprises a management module 11 adapted to retrieve and process the set 9 of data in order to send the operational data 9b to the distant equipment 3 by the downloading protocol engine 9c.

The downloading engine 9c relating to the protocol part between the gateway 5 and the distant equipment 3 is thus retrieved by the gateway 5 at the same time as the operational data 9b intended for the distant equipment 3. The protocol part thus remains under the responsibility of the supplier that owns this distant equipment 3, allowing it to avoid all interface specifications between the gateway 5 and the distant equipment 3.

By way of example, the set 9 of data is an encapsulation layer configured according to a standardized format and concatenating three parts. The first part 9a is a downloading header relating to the distant equipment, the second part 9b relates to the operational data of the equipment (for example software or a part thereof, a configuration table, or any other data) and the third part 9c is the engine enabling the execution of the download to the distant equipment.

Due to the standardized format and the downloading header 9a, the management module 11 hosted on the gateway 5 (CPIOM (Core Processing Input Output Module) or CRDC (Common Remote Data Concentrator)) is capable of recognizing that it must manage a deported download and use the downloading engine 9c to download the operational data 9b into the distant equipment 3. The downloading engine 9c can be executed as a conventional binary code.

The downloading method is thus carried out in three steps. The first step relates to the downloading of the set 9 of data from the downloading computer 7 to the gateway 5 via a first communication network or medium 13a, for example an AFDX (Avionics Full Duplex Switched Ethernet). It will be noted that the frames dedicated to the download may be inserted in a totally conventional manner into existing traffic as a point-to point download between the downloading computer 7 and the gateway 5. There is no need to carry out any protocol adaptation. This means that it is possible to use an existing protocol in the downloading computer 7 by adding to it the layer of encapsulation of the set 9 of data.

The second step relates to the processing of the set 9 of data by the gateway 5 and, finally, the third step relates to the downloading of the operational data 9b from the gateway 5 to the distant equipment 3 via a second communication medium (for example A429, CAN, MIL 1553, etc.).

The executable part (i.e. the downloading engine 9c) is advantageously removed after the end of the download in order to free up resources for other downloads.

Furthermore, the progress of the download can advantageously be reported on the man-machine interface of the downloading computer 7. The progress tracking is implemented according to the three downloading steps.

The tracking of the first downloading step is performed in the same way as a conventional download. The progress of the second and third steps is reported to the downloading computer 7 by the management module 11. The progress of the second step is dependent on the progress of the data processing by the management module 11. The progress of the third step is reported by the management module 11 according to a protocol exchange between the latter and the downloading engine 9c via, for example, queueing memories of the communication medium. The downloading engine 9c can thus cyclically write a value of the progress of the download and this value can be used by the management module 11 to report the overall progress of the deported download to the downloading computer 7.

The downloading system and method according to the disclosure herein thus enable the management of all downloading protocols without increasing the number of resources. In fact, the management module 11 of the gateway 5 generically enables the retrieval and management of the data to be downloaded on a case-by-case basis. Similarly, development costs are reduced, since it is no longer necessary to cater for all possible cases on all types of gateway. Specifications for the interfaces between the gateway and the distant equipment are no longer required. Since the number of interface specifications is drastically reduced, the problems of integration, development and updating of the specifications are eliminated. Furthermore, the prime contractor is no longer responsible for protocol changes. Integration thus becomes the responsibility of the equipment manufacturer who uses and develops the distant equipment, and it is precisely the equipment manufacturer who is best placed to integrate his system. Equipment manufacturers are thus completely free to choose their downloading protocol to best meet their requirements, thus allowing their own costs to be reduced and development to be simplified.

Figure 2A:
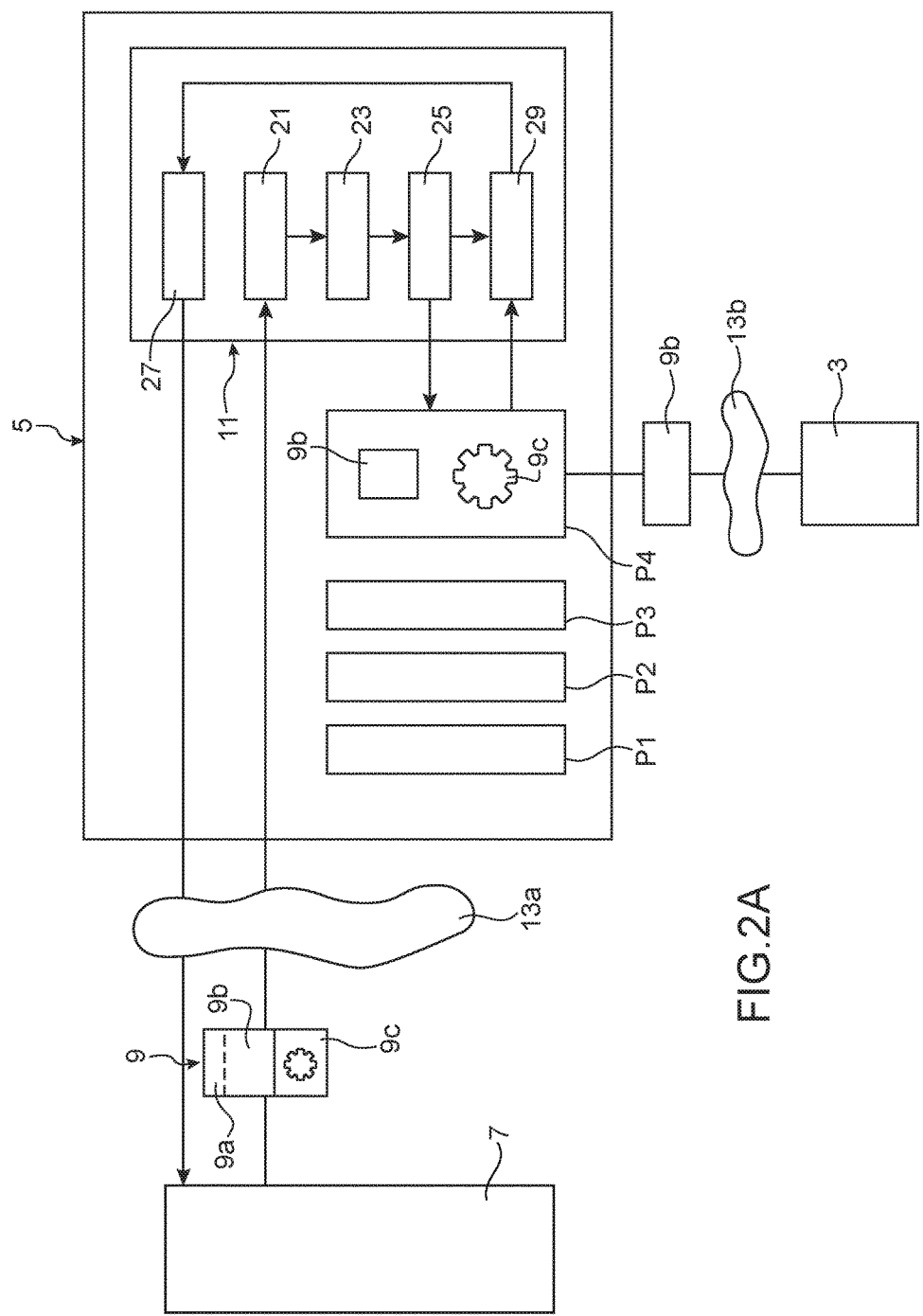
FIGS. 2A and 2B show schematically a system and a method for the deported downloading of data into distant equipment according to a first preferred embodiment of the disclosure herein.

FIG. 2A shows schematically a system for the deported downloading of data into distant equipment according to a first preferred embodiment of the disclosure herein.

The downloading system 1 according to this embodiment comprises a gateway 5 including a management module 11 adapted to manage or create a dynamic partition within the gateway. A dynamic partition is understood to mean a downloading software application which is erased once the download is completed.

A CPIOM gateway which already has a partitioning capacity is advantageously used. In this case, among existing partitions, it suffices to reserve a partition that will be dedicated to a temporary hosting of the set 9 of data and, in particular, of the downloading engine 9c, allowing the management of the downloading of the operational data 9b to the distant equipment 3. From a gateway perspective, this takes place as if a dedicated partition were available for this function.

As previously indicated, the set 9 of data or, more particularly, the operational data 9b have a downloading header 9a. This header complies with the same standard as the headers used to download the other partitions of the gateway. A dedicated interface specification for this equipment does not then have to be taken into account. The same specification can be used for all partitions. This also removes the need to define an interface specification on the side of the gateway 5 and consequently eliminates development and integration problems and the risks of incompatibility. As soon as the gateway recognizes that it is a download intended for the partition, the set 9 of data is downloaded into this partition. The downloading protocol engine 9c created by the manufacturer then transfers the operational data 9b into the distant equipment 3.

The example in FIG. 2A shows that the management module 11 comprises an acquisition module 21, a router 23, a partition manager 25, a progress report manager 27 and a buffer memory 29.

The acquisition module 21 is adapted to acquire the set 9 of data transmitted by the downloading computer 7 via the first medium 13a. The router 23 is adapted to determine, by the format and the header of the set 9 of data, whether these data must be downloaded into distant equipment 3 or must remain on the gateway 5 (or IMA platform). The partition manager 25 is adapted to create a dynamic partition P4 and to start the execution of the protocol engine 9c enabling the transfer of the operational data 9b to the distant equipment 3 via a second communication medium 13b.

Furthermore, the progress report manager 27 is adapted to report the download progress status to the downloading computer 7. Finally, the buffer memory 29 is an exchange memory area between the partition P4 and the progress report manager 27 which indicates the progress status to the latter.

Figure 2B:
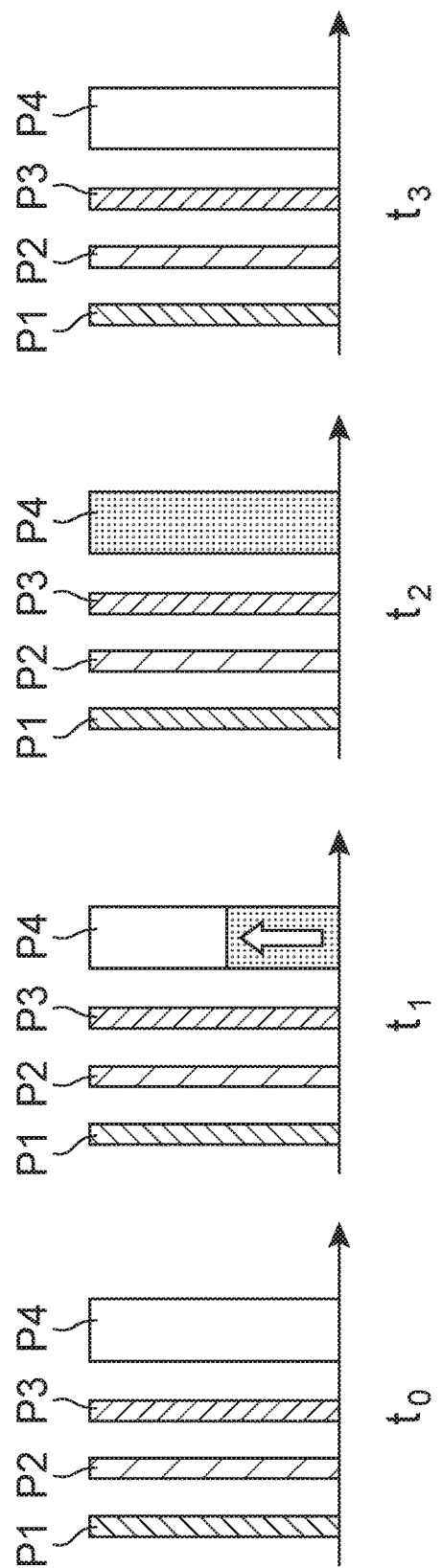

FIG. 2B shows schematically the downloading sequence in relation to the partitions included in the gateway.

The gateway 5 comprises a number N of partitions and, in particular, this example shows that, at the initial time t0, the gateway 5 comprises three partitions P1-P3 which are executed and an empty fourth partition P4 dedicated to the download.

When the manufacturer or supplier of the distant equipment starts to download a set 9 of data from the downloading computer 7, these data are received by the gateway 5.

In fact, at the time t1, the gateway 5 receives the set 9 of data from the downloading computer 7 via the first communication medium 13a (for example AFDX or ARINC 629 in the aeronautical field). It will be noted that the supplier of the distant equipment is responsible not only for the operational data to be downloaded, but also for the corresponding protocol engine.

Thus, at the time t1, the set 9 of data is retrieved by the management module 11 which is itself responsible for placing it on the dynamic partition P4. More particularly, the acquisition module 21 retrieves the set 9 of data transmitted by the downloading computer 7 and then sends it to the router 23. According to this example, the router 23 transmits the set of data to the partition manager 25 after having determined that the data are intended to be downloaded. The partition manager 25 then creates a dynamic partition P4 and starts the execution of the downloading engine.

At the time t2, the retrieval of the data by the dynamic partition P4 from the partition manager 25 is completed.

After the end of the retrieval of the set 9 of data, the dynamic partition P4 executes the downloading engine 9c enabling the transfer of the operational data 9b to the distant equipment 3 via the second communication medium 13b (for example A429, CAN, MIL 1553, etc.). The partition P4 is generated in the same way as the partitions P1-P3, except that the downloading of the operational data into the distant equipment starts automatically after the transfer of the data into the partition P5 has been completed.

Finally, at the time t3, the dynamic partition P4 is removed or its contents are erased after the downloading of the operational data has been completed in order to free up the resources of the gateway 5 for another download. A new partition P4 will thus be available for downloading to a different equipment from a different supplier or from the same supplier but according to a different protocol.

It will be noted that the dynamic partition P4 enables the downloading to be managed without separating the operational data and the downloading engine. This offers more flexibility to the user.

As well as the advantages outlined above, this first embodiment provides a simplified protocol between the downloading computer 7 and the gateway 5. The equipment manufacturer or the supplier is free to manage the download between the gateway 5 and the distant equipment 3, obviously provided that it is compatible with the bus standard (A429, CAN, etc.) that it uses. This solution can also be used on existing equipment with few modifications by using a free partition. The development costs on a gateway or an IMA platform would be reduced.

Figure 3:
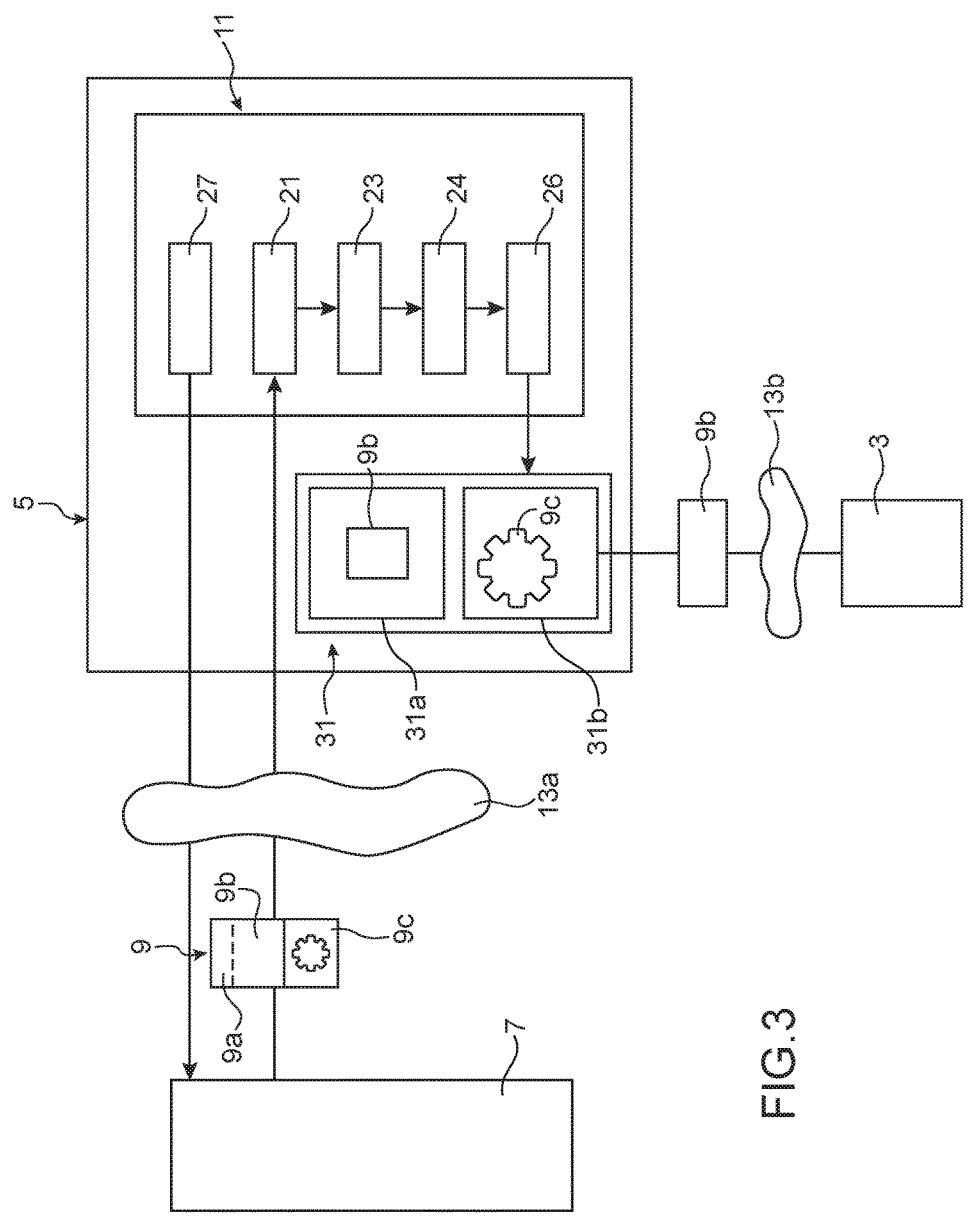
FIG. 3 shows schematically a system for the deported downloading of data into distant equipment according to a second preferred embodiment of the disclosure herein.

FIG. 3 shows schematically a system for the deported downloading of data into distant equipment 3 according to a second preferred embodiment of the disclosure herein.

The downloading system 1 according to this second embodiment comprises a gateway 5 including a management module 11 and a memory 31 for receiving the download (i.e. the set of data) which is addressed to the distant equipment 3, and to use directly the RAM memory of the gateway 5 in order to execute directly the downloading engine 9c enabling the management of the deported downloading. This embodiment does not use a partition, but a temporary memory 31 (dedicated or not according to the capacities of the gateway) in order to manage the download.

In fact, in the case where the gateway 5 or the IMA platform has processing and memory resources and does not have sufficient partitioning capacity, it is then possible to dispense with a dynamic partition and use memory areas to receive the set of data. The difference compared with the first embodiment lies in the fact that a memory replaces the partition and it is divided into two areas and the purpose of the management module 11 is to manage the data in the memory areas.

According to this embodiment, the gateway 5 comprises a management module 11 and first and second memory areas 31a, 31b. The management module 11 is adapted to extract the operational data 9b and the temporary downloading protocol engine 9c and to store the operational data and the downloading engine in the first and second memory areas 31a, 31b respectively. Furthermore, the second memory area 31b is adapted to execute the downloading engine 9c, thus allowing the downloading of the operational data 9b into the distant equipment 3.

As with the solution proposed according to the first embodiment shown in FIG. 2A, it is possible to use the standard downloading protocol engine. In this case, it is the management module 11 that processes the download differently on the basis of the information contained in the download header.

More particularly, according to the example shown in FIG. 3, the gateway 5 comprises a management module 11 and the first and second memory areas 31a, 31b. The memory areas may be RAM or EEPROM flash memories or other memories.

The management module 11 comprises an acquisition module 27, a router 23, an extraction module 24, a memory manager 26 and a progress report manager 27.

As in the first embodiment shown in FIG. 2A, the acquisition module 27 is adapted to acquire the set 9 of data transmitted by the downloading computer 7. Furthermore, the router 23 is adapted to determine, on the basis of the format and the header of the set of data, whether these data must be downloaded onto distant equipment 3 or must remain on the gateway 5.

Conversely, the extraction module 24 is adapted to extract the operational data 9b and the temporary downloading protocol engine 9c and transmit them to the memory manager 26.

Furthermore, the memory manager 26 sends the "operational data" part 9b to the first memory area 31a, the purpose of which is to store these data temporarily. Furthermore, the memory manager 26 sends the "downloading protocol engine" part 9c into the second memory area 31b, the purpose of which is to execute this code in order to manage the downloading of the operational data. In this embodiment, the set 9 of data (which is under the responsibility of the equipment manufacturer) is thus configured in two distinct parts which can be interpreted by the memory areas 31a, 31b and can be operated by the management module 11. Here, the equipment manufacturer is somewhat more constrained than in the solution of the first embodiment, but this constraint allows the avoidance of a partition.

As previously, the progress report manager 27 is adapted to report the download progress status to the downloading computer 7.

Furthermore, the contents of the first and second memory areas 31a, 31b are erased once the downloading of the operational data is completed.

The present disclosure is also intended for an aircraft comprising an integrated and modular avionics architecture IMA as well as a downloading system according to any one of the embodiments relating to FIGS. 1-3.

Furthermore, any distant equipment (for example computers in aeronautics, railroad, automobile, etc.) needing to be updated via different protocols can benefit from the embodiments of the present disclosure.

The subject matter disclosed herein can be implemented in software in combination with hardware and/or firmware. For example, the subject matter described herein can be implemented in software executed by a processor or processing unit. In one exemplary implementation, the subject matter described herein can be implemented using a computer readable medium having stored thereon computer executable instructions that when executed by a processor of a computer control the computer to perform steps. Exemplary computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A system for deported downloading of data into distant equipment of an aircraft, the system comprising a gateway implemented on an integrated modular avionics (IMA) platform for the aircraft and adapted to receive an encapsulation layer as a set of data including:
   a downloading header relating to the distant equipment, operational data addressed to the distant equipment, and
   a temporary downloading protocol engine relating to a protocol part between the gateway and the distant equipment, wherein the downloading header, operational data, and temporary downloading protocol engine are concatenated within the encapsulation layer and wherein the downloading header complies with a standard format for storing data on the gateway;
   the gateway furthermore being adapted to:
   recognize, based on information contained in the downloading header and determining that the downloading header, operational data, and temporary downloading protocol engine are concatenated within the encapsulation layer, that the operational data is for deported downloading onto the distant equipment and not for storage on the gateway; and download the operational data into the distant equipment by starting execution of the temporary downloading protocol engine;

wherein the gateway comprises a management module adapted to manage a dynamic partition within the gateway, the dynamic partition being adapted to host the set of data and to execute the downloading engine, thus enabling downloading of the operational data into the distant equipment, and wherein the gateway is adapted to use a standard downloading protocol engine for both storing data in static partitions of the gateway using the standard format and for receiving the encapsulation layer, and wherein the management module is adapted for recognizing that the operational data is for deported downloading using the temporary downloading protocol engine instead of the standard downloading protocol engine.

2. The system as claimed in claim 1, wherein the management module is adapted to remove the dynamic partition once the downloading of the operational data is completed.

3. The system as claimed in claim 1, wherein the gateway comprises a report manager adapted to report the progress status of the downloading of the operational data into the distant equipment.

4. The system as claimed in claim 1, comprising a downloading computer adapted to download the encapsulation layer concatenating the set of data to the gateway via a first communication medium and in that the gateway is adapted to download the operational data to the distant equipment via a second communication media.

5. The system as claimed in claim 4, wherein the first and second media are two media from the following media: AFDX, ARINC 629, CAN, MIL 1553 and ARINC 429.

6. An aircraft comprising a downloading system as claimed in claim 1.

7. A method for deported downloading of data into distant equipment of an aircraft, comprising:

downloading an encapsulation layer as a set of data from a downloading computer to a gateway implemented on an integrated modular avionics (IMA) platform for the aircraft via a first communication medium, the set of data including a downloading header relating to the distant equipment, operational data addressed to the distant equipment, and a temporary downloading protocol engine relating to a protocol part between the gateway and the distant equipment, wherein the downloading header, operational data, and temporary downloading protocol engine are concatenated within the encapsulation layer and wherein the downloading header complies with a standard format for storing data on the gateway;

recognizing, by the gateway and based on information contained in the downloading header and determining that the downloading header, operational data, and temporary downloading protocol engine are concatenated within the encapsulation layer, that the operational data is for deported downloading onto the distant equipment and not for storage on the gateway;

managing a dynamic partition within the gateway, the dynamic partition being adapted to host the set of data and to execute the downloading engine, thus enabling downloading of the operational data into the distant equipment, and using a standard downloading protocol engine for both storing data in static partitions of the gateway using the standard format and for receiving the encapsulation layer;

recognizing that the operational data is for deported downloading using the temporary downloading protocol engine instead of the standard downloading protocol engine;

executing the temporary downloading protocol engine by the gateway; and downloading the operational data from the gateway to the distant equipment via a second communication medium.

* * * * *